United States Patent [19]

Iwata et al.

[11] 4,369,558
[45] Jan. 25, 1983

[54] OUTER RACE WORKING METHOD AND APPARATUS THEREFOR

[75] Inventors: Yasuo Iwata; Hisao Shirai, both of Toyota, Japan

[73] Assignee: Toyota Jidosha Kogyo Kabushiki Kaisha, Toyota, Japan

[21] Appl. No.: 211,848

[22] Filed: Dec. 1, 1980

[30] Foreign Application Priority Data

Sep. 10, 1980 [JP] Japan .................. 55-125692

[51] Int. Cl.³ .............................................. B21K 1/04
[52] U.S. Cl. ...................... 29/148.4 R; 29/149.5 B; 29/725; 72/399
[58] Field of Search .................. 29/725, 724, 148.4 R, 29/149.5 B, 149.5 DP, 149.5 C, 149.5 R, 149.5 NM; 72/399, 452

[56] References Cited

U.S. PATENT DOCUMENTS 3,267,560  8/1966  Rejeski .................................. 72/399

FOREIGN PATENT DOCUMENTS 5224978  8/1975  Japan .
55-141347  11/1980  Japan ........................ 29/148.4 R Primary Examiner—Carl E. Hall
Assistant Examiner—V. K. Rising
Attorney, Agent, or Firm—Oblon, Fisher, Spivak, McClelland & Maier

[57] ABSTRACT

Herein disclosed are outer race working method and apparatus of the type, in which such a roughly shaped outer race workpiece of a Birfield type constant-velocity ball joint as is formed with a groove made axially straight at its portion above the joint center and having an axial curvature below the joint center, in which a hexagonal-pillar guide punch and a split mandrel composed of six segments are inserted into the aforementioned groove of the roughly shaped workpiece thereby to iron the inner surface of the aforementioned groove and to form both a center hole corresponding to the center of a ball rolling groove and a face for providing a reference for the axial position of the groove center, and in which the roughly shaped workpiece is then ironed by means of an ironing die, whereby the ball rolling groove is plastically worked all over its surface from its lower portion to its upper portion.

5 Claims, 3 Drawing Figures

FIG. I
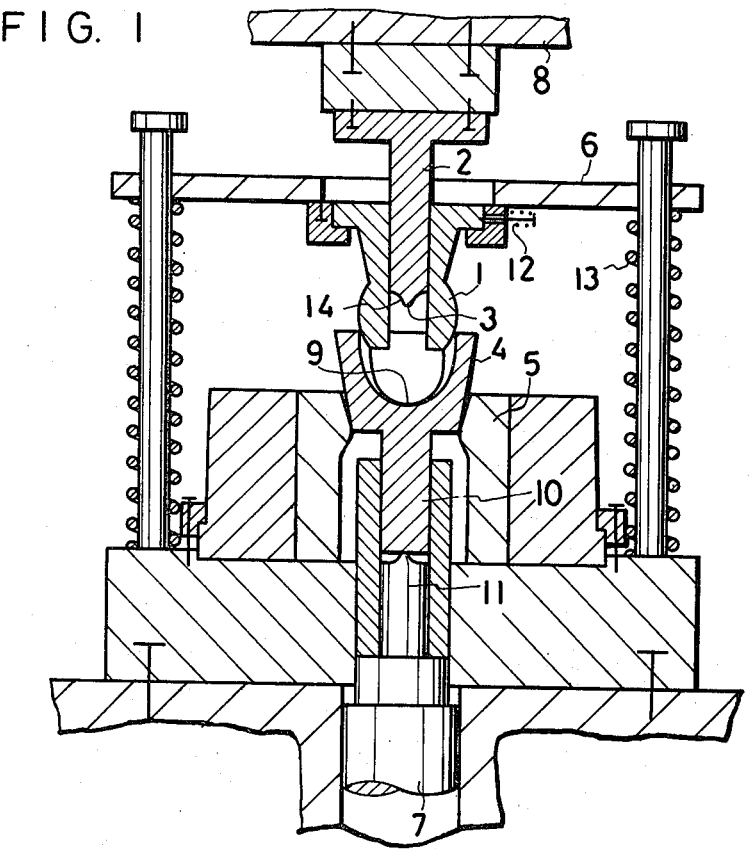
FIG. 2
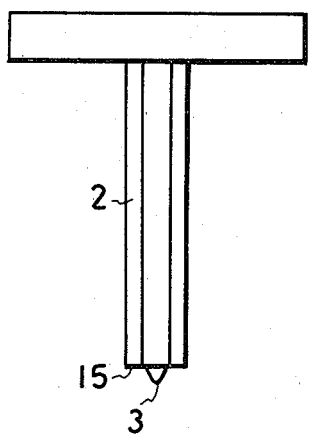
FIG. 3
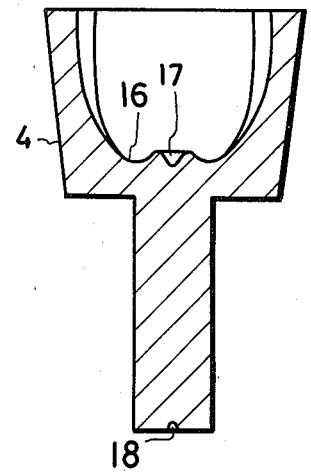

OUTER RACE WORKING METHOD AND APPARATUS THEREFOR

BACKGROUND OF THE INVENTION

The present invention relates to both a method of plastically working the outer race of a Birfield type constant-velocity ball joint and a method therefor.

The working of the ball rolling grooves (which will be shortly referred to as the "groove") of the outer race in the Birfield type constant-velocity ball joint has been performed both in a machining manner and in a plastic manner according to the prior art. In the case of the machining manner, the groove itself is not machined before a center hole and a face for providing a reference for the axial position of the groove center (which face will be shortly referred to as the "axial reference face") are machined in advance. In this case, however, there arise problems that the yield is not acceptable, that it takes a long time to effect the machining, and that the lifetime of a cutting tool for machining the groove is short. Therefore, a trial has been made to plastically work the groove. However, since the groove has a shape unsuitable for providing the working reference even if it is worked highly precisely, a sufficient precision cannot be achieved even if the inner spherical surface, the shaft or the like is machined according to the groove reference. As a result, another working reference is provided to effect the cutting operations of all the work portions including the groove.

Therefore, if the working references (i.e., the center hole and the axial reference face) can be worked highly precisely in the groove which has been precisely shaped by the plastic working process, then the cutting process of the groove can be omitted, and still the better even the grinding process of the groove can be abolished, as the case may be.

However, the plastic working process according to the prior art has failed to suffice the aforementioned desire.

SUMMARY OF THE INVENTION

It is therefore an object of the present invention to plastically work, in high precision, the ball rolling groove of the outer race of a Birfield type constant-velocity ball joint, the center hole corresponding to the center of said groove, and the face for providing a reference for the axial center position of said groove.

Another object of the present invention is to work the ball rolling groove without any cutting process and, as the case may be, without any griding process by plastically working a working reference in high precision.

BRIEF DESCRIPTION OF THE DRAWINGS

FIG. 1 is a partially sectional front elevation showing a first embodiment of the present invention;

FIG. 2 is an enlarged front elevation showing a guide punch according to a second embodiment of the present invention; and FIG. 3 is an enlarged sectional front elevation showing a roughly shaped outer race work according to the same embodiment.

DETAILED DESCRIPTION OF THE INVENTION

The present invention is directed to a method of working an outer race without any cutting process or the like of the groove by plastically working the aforementioned working reference, which is formed in the roughly shaped outer race work, in high precision simultaneously with the formation of the groove.

The present invention will be described in the following in connection with the embodiments thereof with reference to the accompanying drawings.

FIG. 1 shows a first embodiment of the present invention and corresponds to the case, in which the axial reference face can be replaced by the tapered surface of a center hole. Indicated at reference numeral 1 in FIG. 1 is six split mandrel segments which have their outer contour formed into the inside shape of the groove of an outer race. Numeral 2 indicates a hexagonal-pillar guide punch which is positioned inside of those segments 1 so that it receives a main external pressure. Numeral 3 indicates a centering tip which is formed at the leading end of said punch 2. Numerals 4 and 5 indicate a roughly shaped outer race workpiece (which is shortly referred to as the "work") and an ironing die, respectively. Numeral 6 indicates a support supporting the aforementioned segments 1. Numerals 7, 8, 9, 10 and 11 indicate a cushion, an upper ram, the bottom of the aforementioned roughly shaped workpiece 4, a shaft end, and a counter punch, respectively. Numerals 12 and 13 indicate springs. Numeral 14 indicates the tapered surface which is formed on the leading end of the aforementioned punch 2. Moreover, the groove, which is formed in the aforementioned roughly shaped outer race workpiece 4, is made axially straight at its portion above the joint center, while being made smaller by 0 to 10% than the segments, and is formed at its portion below the joint center into a surface having a curvature in the axial direction.

In the outer race working apparatus having the construction shown in FIG. 1, if the upper ram 8 moves down, the hexagonal-pillar guide punch 2 is forced into the space defined by the six segments 1, thus constituting the mandrel. When the upper ram 8 further moves down, the groove of the roughly shaped outer race workpiece 4 is ironed by the aforementioned mandrel. With a further downward movement, both the bottom 9 of said roughly shaped workpiece 4 and the shaft end 10 are formed with center holes by the cutting tip 3 formed at the leading end of the guide punch 2 and by the counter punch 11 placed on the cushion 7, respectively. With a further downward movement, the cushioning load yields to the load of the upper ram 8 so that said roughly shaped workpiece 4 has its outside diameter ironed by the ironing die 5 until it is formed with the groove profiling the contour of said segments 1. After the formation of the groove has been finished in those ways, the upper ram 8 moves up so that the guide punch 2 is retracted to leave the segments 1. When said guide punch 2 is released, the segments 1 are brought to the center by the action of the spring 12 so that they are allowed to leave the roughly shaped workpiece 4 by the action of the spring 13. Subsequently, the roughly shaped workpiece 4, which has been formed with the groove and worked at its center hole and axial reference face, is knocked out onto the die 5, thus completing one cycle of the working steps. In this embodiment, incidentally, a press having a cushioning function has been described by way of example.

Next, a second embodiment of the present invention will be described with reference to FIGS. 2 and 3 in case the axial reference face is formed by a place other than that for the center hole. Specifically, it is recommended to resort to this second embodiment in case the target precision cannot be attained so long as the tapered surface 14 of the centering tip 3 of the hexagonal-pillar guide punch 2 for forming the center hole is used as the axial reference face. In this second embodiment, more specifically, the following three items are simultaneously incorporated, as shown in FIGS. 2 and 3. However, even if all of those items are not incorporated, their intrinsic effects can be independently obtained. According to the first item, specifically, since the axial reference face can be located more easily at a flattened surface than at the tapered surface, it is formed into the flattened surface 15 (as shown in FIG. 2) of the hexagonal-pillar guide punch 2. According to the second item, in order to reduce the shaping load of the reference face, the roughly shaped workpiece 4 is made to have its bottom formed with an escapement 16 (as shown in FIG. 3) thereby to reduce the shaping area. According to the third item, in order to reduce the shaping load of the center hole, smaller center holes 17 and 18 (as shown in FIG. 3) are formed in advance.

As has been described hereinbefore, according to the outer race working method of the present invention, the formation of the groove is first performed by ironing the inner wall (inner surface) of the roughly shaped outer race workpiece with the use of the hexagonal-pillar guide punch and the split mandrel composed of the six segments. Since the groove formed in said roughly shaped workpiece is made axially straight at its portion above the joint center, while being made suitably smaller than the mandrel segments, and is made to have an axial curvature at its portion below the joint center, the mandrel goes, while ironing, into the groove so that it enters the roughly shaped workpiece with an excellent concentricity. On the other hand, since the leading end of the hexagonal-pillar guide punch is so shaped that it can form the center hole and the axial reference face, these center hole and axial reference face are formed at the later half of the groove ironing process so that the center hole can be formed in high precision with respect to the groove of roughly shaped workpiece. After that, this workpiece is ironed by the ironing die thereby to shape the whole surface of the groove from its lower portion to its upper portion. This shaping process can provide the groove having an excellent concentricity relative to the center hole partly because the split mandrel is fixed by means of the center hole which is formed highly precisely and partly because that mandrel has a uniform ironing allowance. Moreover, since the groove is shaped in accordance with the axial reference face thus shaped, the distance between the groove center and the axial reference face can be determined highly precisely. Thus, according to the working method of the present invention, it is possible to highly precisely shape the center hole and the axial reference face by the plastic working which is in the same step as that of the forming the groove and to remarkably shorten the whole process of production.

In the outer race working apparatus according to the present invention, on the other hand, the mandrel used is composed of the six split mandrel segments, which have their contour formed into the shape of the inner wall of the outer race, and the hexagonal-pillar guide punch which is positioned inside of those segments so that it receives the major external pressure. As a result, it becomes remarkably easy to effect the insertion of the roughly shaped outer race workpiece into the groove, the plastic working for forming the groove, and the extraction of the mandrel from the workpiece after the groove shaping process. Moreover, since the leading end of the aforementioned guide punch is formed with both the tip for forming the center hole and the surface for forming the axial reference face, both the center hole and the axial reference face can be shaped highly precisely with respect to the groove of the aforementioned roughly shaped workpiece. At the same time, since the ironing die for ironing, while bearing, the outer surface of said roughly shaped workpiece, the aforementioned center hole and axial reference face can be shaped highly precisely so that the groove having an excellent concentricity relative to the aforementioned center hole can be shaped at the final groove ironing process.

Incidentally, although the foregoing description is directed mainly to the case, in which the mandrel is split into six segments and in which the guide punch has a shape of a hexagonal column (pillar), it is sufficient that the mandrel is divided into at least six segments and that the guide punch correspondingly has a polygonal shape having at least three sides.

What is claimed is:

1. An outer race working method comprising the steps of:
    ironing the inner surface of the groove, which is formed in the roughly shaped outer race workpiece of a Birfield type constant-velocity ball joint such that it is made axially straight at its portion above the joint center, while being made suitably smaller than a working mandrel, and such that it is made to have an axial curvature at its portion below the joint center, so that said groove may become a ball rolling groove, by inserting a hexagonal-pillar guide punch and a split mandrel composed of six segments into said groove;
    forming both a center hole corresponding to the center of said ball rolling groove and a face for providing a reference for the axial center of the groove center at a later half of the groove ironing step; and
    ironing said roughly shaped workpiece by means of an ironing die, whereby the ball rolling groove is plastically worked all over its surface from its upper portion to its lower portion.

2. An outer race working method according to claim 1, wherein the roughly shaped workpiece used is formed with the groove which is made smaller by 0 to 10% than said mandrel at its portion above the joint center.

3. An outer race working method according to claim 1, wherein the roughly shaped workpiece used is formed with the groove which is made to have the axial curvature at the portion below said joint center and said workpiece is formed with an escapement at its bottom.

4. An outer race working method according to claim 1, wherein the roughly shaped workpiece used is formed with a relatively small center hole in advance.

5. An outer race working apparatus for plastically working a product by ironing the roughly shaped outer race workpiece of a Birfield type constant-velocity ball joint, comprising: six identical mandrel segments having their contour formed into the shape of the inner surface of the ball rolling groove of said outer race; a hexagonal-pillar guide punch positioned inside of said mandrel segments for receiving a main external pressure; and an ironing die for ironing, while bearing, the outer surface of said roughly shaped outer race workpiece, said guide punch having its leading end formed with a tip for forming a center hole and a face for providing a reference for the axial position of the center of said ball rolling groove.

* * * * *